United States Patent [19]

Decker, deceased et al.

[11] 4,156,997
[45] Jun. 5, 1979

[54] LIGHT WEIGHT TENSION-COMPRESSION EQUILIBRIUM STRUCTURES

[76] Inventors: Bert J. Decker, deceased, late of Buffalo, N.Y., Jean S. Decker, executrix, 136 Capen Blvd., Buffalo, N.Y. 14226

[21] Appl. No.: 595,853

[22] Filed: Jul. 14, 1975

[51] Int. Cl.² ............................................. E04C 3/10
[52] U.S. Cl. .................... 52/223 R; 52/648; 52/695
[58] Field of Search ................... 52/73, 695, 223, 648, 52/225; 61/3

[56] References Cited

U.S. PATENT DOCUMENTS

| 459,700 | 9/1891 | Moore | 52/695 |
|---|---|---|---|
| 758,178 | 4/1904 | Hedrick | 52/225 |
| 1,281,021 | 10/1918 | Kellner | 61/3 |
| 2,099,589 | 11/1937 | Armbruster | 52/695 |
| 2,387,355 | 10/1945 | Rehfeld | 61/3 |
| 2,407,034 | 9/1946 | Rehfeld | 61/3 |
| 3,179,211 | 4/1965 | Dunlavy | 52/648 |
| 3,195,274 | 7/1965 | Itoh | 52/73 |
| 3,354,591 | 11/1967 | Fuller | 52/648 |

FOREIGN PATENT DOCUMENTS

163047  9/1948  Austria .......................................... 52/83

OTHER PUBLICATIONS

American Handicrafts' Catalogue #66, 8/30/1974, p. 5.

*Primary Examiner*—Price C. Faw, Jr.
*Assistant Examiner*—Harry Raduazo
*Attorney, Agent, or Firm*—Raymond F. Kramer

[57] ABSTRACT

Light weight tension-compression equilibrium structures include structural units which contain a plurality of compression members in contact with each other in an interior portion of the unit and a plurality of tension members in contact with them and exerting balanced tensions on them to hold them in position with respect to each other, and to produce compressive forces in the compression members which are directed toward the point(s) of contact of the compression members in the interior of the unit, thereby strengthening the compression members and the structural units. The tension members are positioned apart such distances along the compression members less than lengths at which the compression members alone would buckle under applied compressive forces. The various structural units may be essentially planar, useful for forming walls or relatively thin supporting structures, or they may be made three-dimensional so as to be capable of serving as major load-bearing units. Various types of tension-compression equilibrium structures are illustrated, including parallelepipedal units wherein the compression members are interlocking twin tetrahedrons or such tetrahedrons internally braced by compression members or "planes" connecting the intersections of diagonals of the parallelepiped sides, or parallelepipeds made from a plurality of essentially planar tension-compression units and such structural units and pluralities of them joined together, preferably with additional tension parallelepipeds between them and exerting tension thereon, may be employed as load-bearing components of buildings, bridges, tunnels, subways towers, stanchions, dams, roadways and various other structures.

9 Claims, 3 Drawing Figures

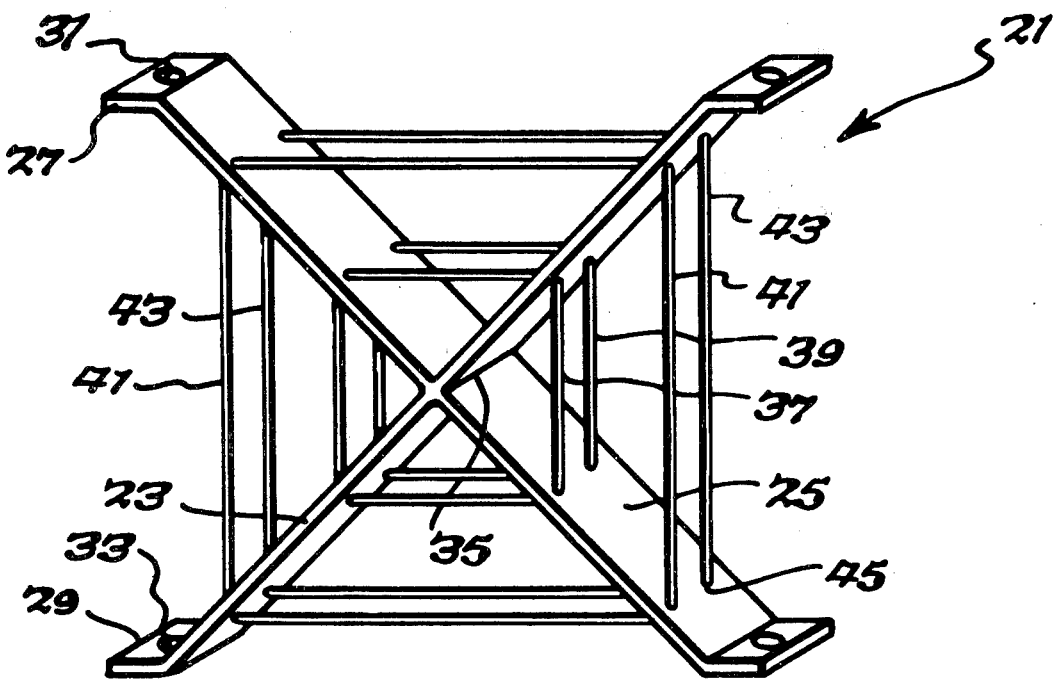

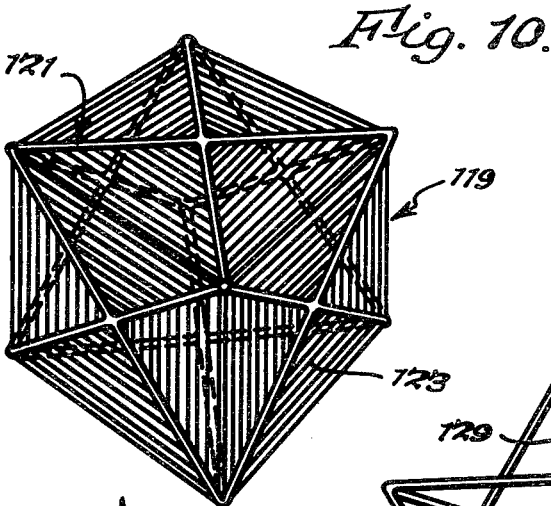
Fig. 10.
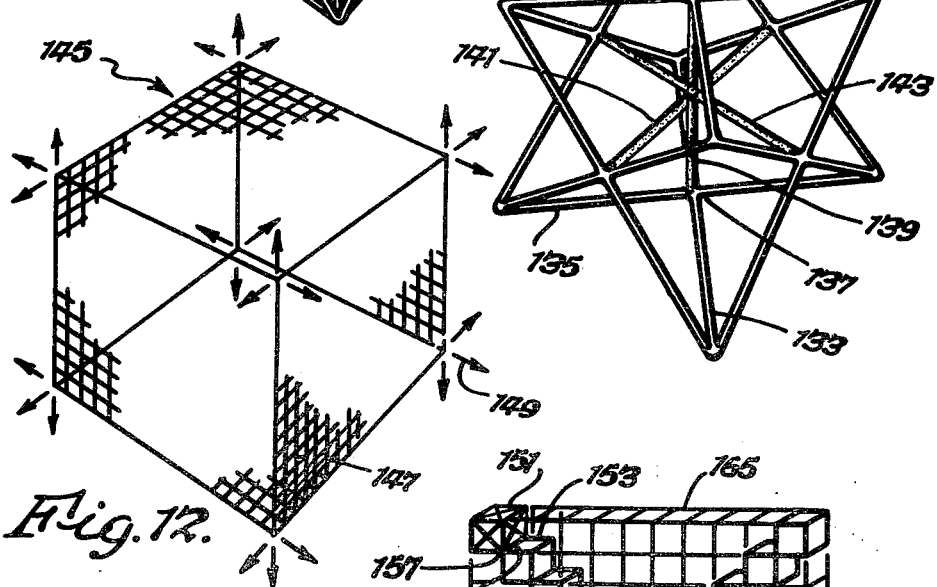
Fig. 11.
Fig. 12.
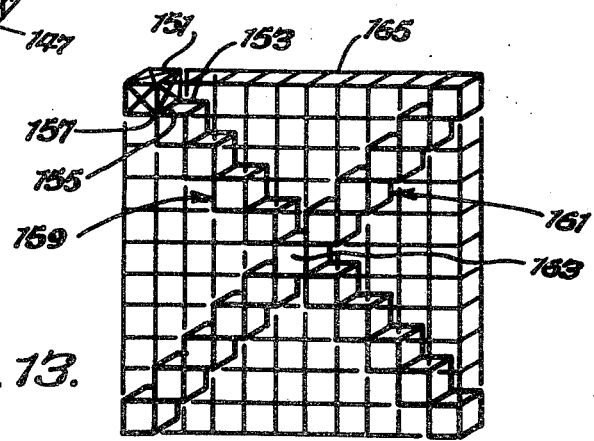
Fig. 13.

LIGHT WEIGHT TENSION-COMPRESSION EQUILIBRIUM STRUCTURES

This application relates to novel structural units and to structures incorporating them. More particularly, it relates to light weight tension-compression equilibrium structures wherein compression members of strengths less than those normally required are employed and their compressive strengths are increased by the utilization of tension members between them.

A wide variety of structural designs has been utilized in an effort to increase strength, decrease weight and lower costs of supporting structures for buildings, bridges, towers, etc. With the availability of high strength steels and special alloys strong structures may be made which are much lighter in weight than those previously necessary. However, the special metals and the processing required for the manufacture of such steels and alloys involve costs which are significantly greater than those for ordinary steels when comparable weights are employed.

In the past, various types of reinforcements and trussing, girder, column and beam designs and methods of joinders of such structural elements were employed to produce stronger units. In some cases, tension wires were used, which allowed the manufacture of much improved structural units. However, in such cases, the compression units would form the outer portions of the structures and the tension wires would be internal, normally acting to exert an inward force on the surrounding compression members, which would be strong enough to resist inward movement and would be strengthened against distortion or failure by the applied tensile forces, e.g., as in a bicycle wheel, wherein the spokes may be considered as tension members, with the rim as the compression member. In some cases, rigid members could be located internally and could be covered by planar structures fastened to them, which structures could aid in holding compression members in position so that they would resist failure under compressive loads. Also it has long been recognized that triangular structures are planar structures which are especially strong and the tetrahedron, composed of triangles, is a very strong three-dimensional structural unit.

Although the prior art has recognized the problem of strengthening compression members, before the present invention this was not done in such a way as to produce the invention herein described, and the desirable and improved results thereof, increased strength of structural units and members, with attendant light weight and low cost and with the permissible use of ordinary materials, were not obtained.

In accordance with the present invention a light weight structural unit comprises a plurality of compression members of lengths greater than those for their limiting slenderness ratios, in contact with each other in an interior portion of the unit and a plurality of tension members in contact with such compression members and exerting balanced tensions on the compression members to hold them in position with respect to each other and to strengthen them, and producing compressive forces in the compression members which are directed toward the points of contact of the compression members in the interior portion of the unit, said tension members being held to the compression members so that the distance between the tension members along the compression members is less than the length at which the compression members alone would buckle under the applied compressive forces thereon. More particularly, in preferred embodiments of the invention, a light weight essentially planar structural unit comprises at least three compression members in contact with each other in an interior portion of the unit and a plurality of tension members in contact with such compression members and exerting balanced forces on the compression members in the plane of the structural unit to hold the compression members in position with respect to each other and to strengthen them, said tension members producing compression forces in the compression members which are directed in the plane of the structural unit toward the point of contact of the compression members in the interior portion of the plane of the structural unit, said forces plus compressive forces applied to the compression members exceeding the amount of force normally required to buckle said compression members and said tension members being distributed along the lengths of the compression members so that the distances between the tension members along the compression members are less than the lengths at which the compression members alone would buckle under the total compressive forces thereon. In some preferred embodiments of the invention the compression members may be diagonals of a rectangle (or parallelogram) and the structural unit may be a comparatively thin wall or facing unit, with tension members connecting the compression members and exerting balanced tensile forces on them. Also, the structures may be three-dimensional, formed by three "planar" units, each constructed by exerting tension on two of three diagonals which are at right angles to each other and all of which pass through a common origin, or may be of the twin tetrahedron (compression members) type. In a preferred embodiment of the invention a plurality of three-dimensional structural units of the invention is held together by a plurality of tension cubes or parallelepipeds, each of which is composed essentially of only tension members, capable of exerting tensile forces on the compression members.

The invention will be readily understood by reference to the present specification, taken in conjunction with the drawing in which:

FIG. 10 is a perspective view of the twin tetrahedrons of FIG. 9 wherein the compression members are sides of the twin tetrahedrons, which are also diagonals of a parallelepiped (a cube is illustrated) connected to each other only at the corners and intersections thereof, and the tension members connect such compression members and help to define the exterior of such parallepiped;

FIG. 11 is a perspective view of an internally compression braced twin tetrahedron structure, illustrating the bracing compression members but, for clarity, omitting showing of the plurality of the tension members which can connect the bracing compression members (as in FIG. 4) and similarly omitting such tension members between the compression member sides or edges of the twin tetrahedron structure in the manner shown in FIG. 10.

FIG. 12 is a perspective view of a tension wire right parallelepiped showing the parallel tension members thereof defining the edges and faces of the parallelpiped and indicating the presence of forces being exerted outwardly from the corners of the parallepiped; and FIG. 13 is a perspective view of a light weight structural unit of panel design, which may be considered as related to the units of FIGS. 1, 3, and 10–12, composed of three-dimensional balanced tension-compression structural units of the present invention with tension wire parallelepipeds exerting tensile forces between such tension-compression structures, whereby an enlarged panel or wall is formed.

Figure 1:
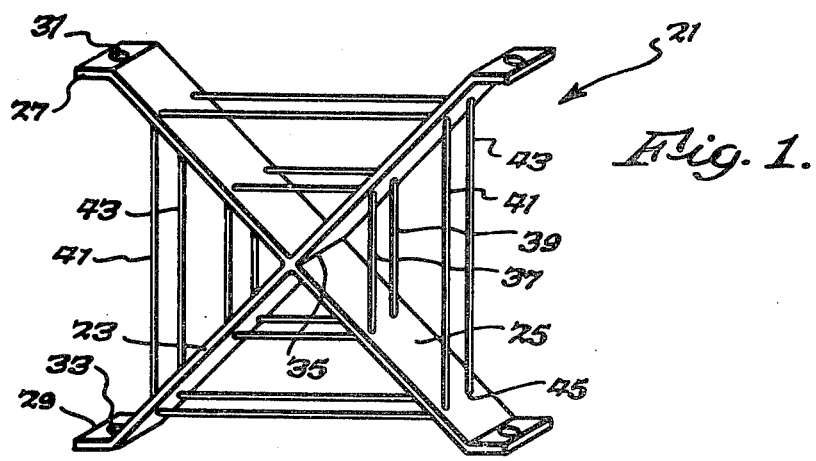
FIG. 1 is a perspective view of a light weight structural unit of this invention, in panel form, showing only some of the tension members connecting the crossed diagonal compression members.

The light weight structural unit 21 of FIG. 1, which may be referred to as the Double Diagonals Tension Rectangle or Double Diagonals Tension Rectangular Panel, includes crossed diagonal compression members 23 and 25, both of which are flat strips which would normally bend or fail under normal compressive forces applied axially or at an angle thereto (which angle would usually be 0° to 75° from the strip, bar or plate axis). At the ends of each of the flat strips are bends, such as those at 27 and 29, which are parallel to the sides of the structural unit formed, each of which ends has an opening therein, 31 and 33, respectively, for affixing to other such structural units or to other mounting or supporting means. Of course, similarly functioning fastening means may also be joined to or formed integrally with the compression members. Compression members 23 and 25 are preferably interfitted together where they cross, as at intersection 35. Such interfitting is preferably made by having each compression member strip half cutaway to permit slotting into and fitting with the other diagonal compression member, after which said members are welded or otherwise permanently fastened together. Although such welding and permanent interfitting are not necessary they are desirable, however. In the illustration of FIG. 1 the invented tension-compression equilibrium structural member is of essentially square shape although other rectangles and other parallelograms may also be employed. However, the squares and rectangles are much preferred.

For purpose of illustration only two sets of tension wires have been illustrated in FIG. 1. Representative of these are near interior wires such as that designated by numeral 37, more remote interior wires 39, near exterior wires 41 and more remote exterior wires 43. These and the corresponding other twelve wires may be separately fastened to the compression members in balanced tension or individual wires may be passed through openings in the compression members, as at 45, placed under the desired tension and joined together, as by welding, tying, crimping or other suitable means. It is often preferred to utilize a single length of tension wire and pass it through openings in the compression members and fasten it in place with respect to such members. In the drawing, wherein only two sets of tension wires are shown, it should be considered that more wires would be employed, between intersection 35 and wires 37 and 39, between wires 37 and 39 and wires 41 and 43 and between wires 41 and 43 and the appropriate ends like those designated 27 and 29 and the distances between the wires or between the innermost wires and intersection 35 and between the outermost wires and the ends (and corresponding other parts of the structure) are less than the length of strip 25 that would normally fail or buckle under the usual compressive load applied to such strip axially or applied to the external force-transmitting parts of the panel structure. Normally a multiplicity of wires, e.g., from 5 to 100 and often 8 to 25, will be utilized and from 1 to 10 and often from 2 to 6 wires will be employed across the widths of the compression strips. Whether constructed as illustrated or with many more tension wires, the principle of operation of the structural unit is essentially the same. The wires, positioned at distances apart which are less than what will be referred to as the limiting slenderness ratio of the compression members (the ratio of length to equivalent [on an area basis] circular diameter at which a normal load would cause buckling) exert forces on such members which allow them to support greater compressive loads than would normally be the case because they are incapable of failing or buckling with the forces of the plurality of tension members holding them in desired position. Also, the compressive action is such that forces are transmitted to the interior portions of the compression members, where such meet or cross, and where greater compressive forces can be withstood because of such meetings. Note that the tension members exert forces on the thinner surfaces of the compression members (if one face is thinner, as is often preferred), tending to pull such faces in "opposite" directions. It will be seen that the described unit is superior to normal braced structures which have to utilize much heavier compressive members and in which such members are normally placed about the exterior of the structural unit.

Figure 2:
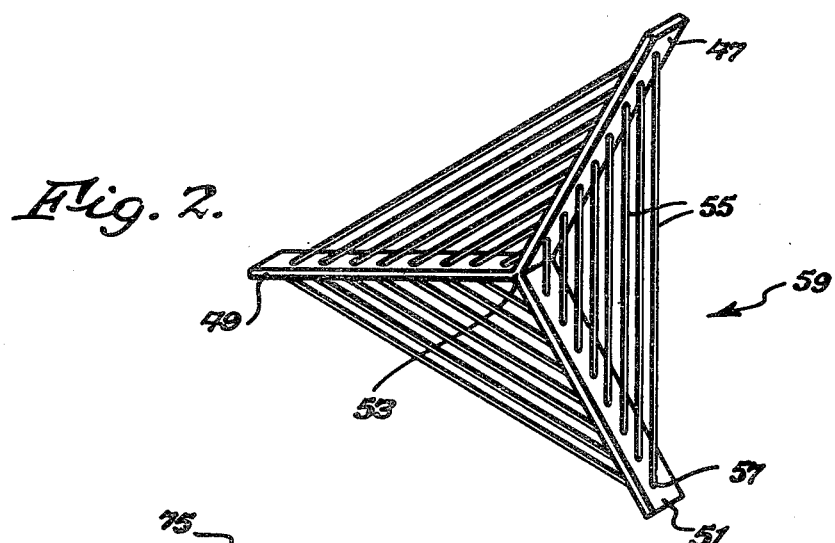
FIG. 2 is a perspective view of a modification of the panel embodiment of FIG. 1, wherein three compression members meet at a central line (or point) and strengthening thereof against compressive forces is effected by a plurality of tension members connecting each pair of compression members.

In FIG. 2 is seen a variation of the structural panel unit of FIG. 1 in which, instead of crossed diagonal compression members, three compression members 47, 49 and 51 are employed, equidistantly spaced and meeting at the center 53 of the equilateral triangle formed by connecting their ends. Tension wires (or equivalent tension members or structures) 55 (this single numeral will be used for all such wires) are located so that they are joined to the compression members or passed through openings 57 therein and are placed under sufficient tension to rigidify the compression members further, preventing them from collapsing under normal loads despite the fact that the compression members are of dimensions which exceed the limiting slenderness ratio. In the structural unit 59 of FIG. 2 it will be noted that only single sets of tension wires 55 are employed, centrally located along the member axes, with the distances between such wires at the compression member being less than ½ the limiting slenderness ratios of the compression members, e.g., 10 to 45% thereof.

Figure 3:
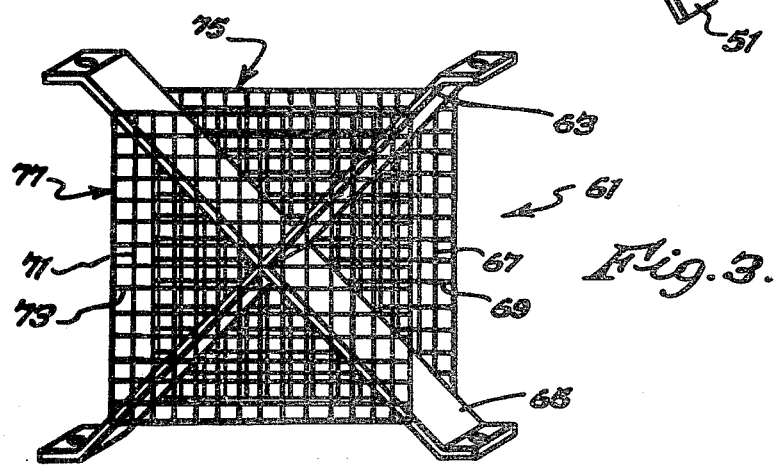
FIG. 3 is a perspective view of a structural unit like that of FIG. 1 but modified so as to have the tension members in screen form affixed to the external edges of the compression members.

In FIG. 3 tension-compression equilibrium structure 61 includes compression members 63 and 65, similar to those of FIG. 1, and tension members 67 and 69 and 71 and 73 are parts of screens or tension member planar assemblies 75 and 77 which are fastened to the sides of the compression members, rather than having the individual wires thereof passing through such members. The screens may be composed of individual wires or may have such wires joined together at the intersections thereof so long as the desired tensions are applied to the compression members to hold them in position and so long as the wires are located in accordance with the teachings of this invention.

Figure 4:
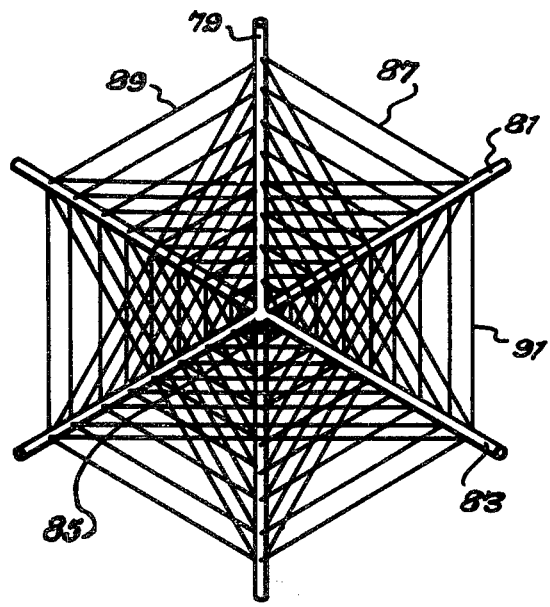
FIG. 4 is a perspective view of a three-dimensional structural unit made from three compression members having a common origin and defining three planes at right angles to one another, with tension members connecting such compression members.
Figure 5:
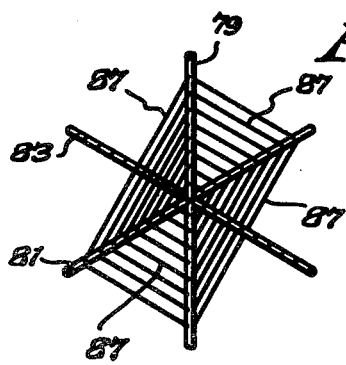
FIGS. 5, 6 and 7 are perspective views, on a reduced scale, of portions of the structural unit of FIG. 4, illustrating separately the sets of tension members joining each pair of compression members.
Figure 6:
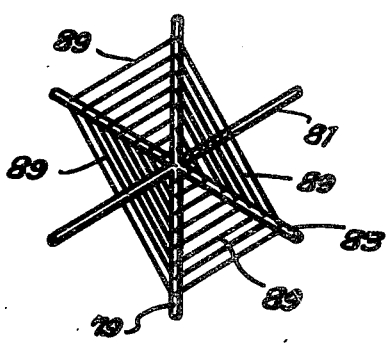
Figure 7:
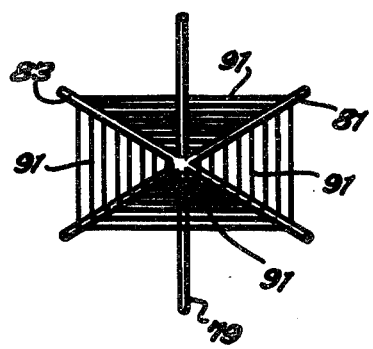

In FIG. 4 tubular or rod compression members 79, 81 and 83 are positioned at right angles to each other and meet at an "origin" 85, so that if planes were to be formed between any two such "rods", each of such planes would be at right angles to the others. Tension wires 87, 89 and 91 represent wires connecting compression members 79 and 81, 79 and 83 and 81 and 83, respectively. The compression members and the individual sets of tension wires are illustrated in the reduced scale representations of FIGS. 5–7, given herein to clarify the more complex structure of FIG. 4. It should be understood that although the compression rods or tubes are considered as single entities, as illustrated, each may be made of two parts, meeting at center 85.

Figure 8:
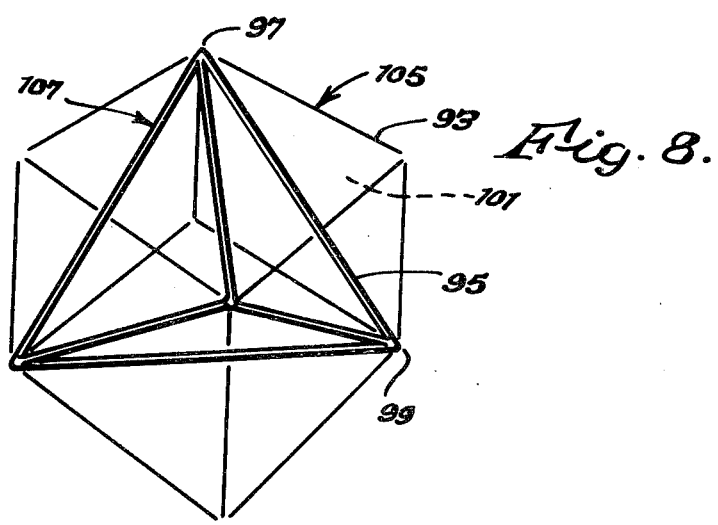
FIG. 8 is perspective view of a parallelepiped (a cube) showing compression members therein of one tetrahedron of the twin tetrahedron construction.

In FIG. 8 parallelepiped (cube) 93 has shown in it a tetrahedron formed by connection of compression members in the positions of diameters of the faces of cube 105. Thus, for example, compression member 95 connects corners 97 and 99 and passes across face 101 of the cube. The other compression members similarly pass across the other five faces of the cube, with one compression member per face, and are connected at corners of the cube, which also become corners of the tetrahedron made by the compression members.

Figure 9:
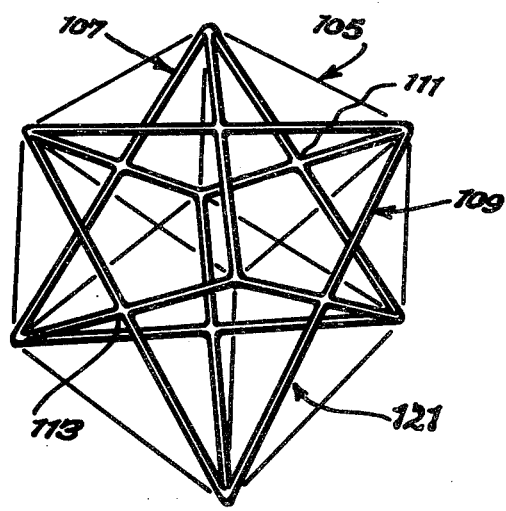
FIG. 9 is a perspective view like that of FIG. 8 but with the twin tetrahedrons and their points of joinder being illustrated.

FIG. 9 shows cube 105 (like that of FIG. 8) with compression member tetrahedron 107 therein and additional twin tetrahedron 109, formed from the other diameters of the faces of the parallelepiped. It will be noted that each of the inscribed tetrahedrons has its own four corners of the cube but the compression members cross each other (and can be held together) at eight points, such as 111 and 113, where they are fastened together, thus strengthening the twin tetrahedron structure.

The tension-compression equilibrium structural unit 119 of FIG. 10 utilizes the compression member framework of FIG. 9, including the twin tetrahedron compression member frame 121 with tension wires 123 so located between the crossed diagonal compression members as to define a cube or other parallelepiped. The direction of orientation of the tension members connecting the crossed diagonals is parallel to the edges connecting corners of the crossed diagonals and the tension members define the parallelepiped, in the present case a cube.

Twin tetrahedron compression member structure 125 of FIG. 11 is composed of compression members 127 and 129, for example, which cross and are joined together at intersection 131. Opposite compression members 133 and 135 intersect at 137. Between intersections 131 and 137 an additional compression member 139 is positioned, exerting its supporting force on the compression members. Similar strength members 141 and 143 connect the other compression members at their points of intersection. If desired, the described members may be strengthened parts of tension-compression units such as that of FIG. 4.

While it is desirable for the tensions of the tension members of various parallelepipeds to be equal, especially when the parallelepipeds are regular, it is within the scope of the invention to use different tensions for different tension members of the various structures of this invention and to position the tension members apart different distances to produce the strongest structures.

The previously described Double Diagonals Tension Rectangles of FIGS. 1 and 3; the Multiple-Spoked Tension Polygon, like that of FIG. 2; the Three Dimensional Tension Cubes, such as those of FIGS. 4–7; and the Twin Tetrahedron Tension Cube, illustrated in FIG. 10; all include compression members and tension members but in FIG. 12 the tension wire cube shown includes no compression members. Tension cube or parallelepiped 145 is composed of tension wires 147 which are joined together in the form of a parallelepipedal (cubic) screen. Force arrows 149 indicate points of application of tension forces on the cube which may be employed, as in FIG. 13, as tension members between tension-compression structural units to maintain them in position under load. Instead of employing the tension wire cube of FIG. 12, tension units not formed into a screen cube may be used instead. However, the cubes are preferred for greater strength.

The twin tetrahedron tension cubes previously described may be joined together to form larger panels and three dimensional structures wherein the combination thereof acts as a compression member. In FIG. 13 tension-compression cubes 151 are joined together with other such cubes, such as that designated by numeral 153, along edges such as 155 and/or at the edge-terminating corners 157 to form crossed diagonal compression members 159 and 161, both of which share a common tension-compression unit 163. The compression members 159 and 161 so made may be considered as incapable of supporting a design load without the application of tension thereto to strengthen them, as has previously been described with respect to the compression members of FIGS. 1–3. Tension cubes 165 are held together at corners and intermediate positions thereof too, if desired, and are fastened to the tension-compression cubes, thereby strengthening the structural unit. Thus, a panel comprising, as illustrated, 21 tension-compression cubes and 100 tension cubes, is made from the smaller units disclosed herein. Of course, by joining together six such panels a tension parallelepiped is produced. Similarly, other and larger structural units, like those of FIGS. 2, 4 and 9–11, may be made by substituting combinations of tension-compression units for the compression units thereof and utilizing tension cubes, such as that illustrated in FIG. 12, in place of the tension members. Instead of positioning the tension-compression units as shown in FIG. 13, they may be joined face to face and tension units of appropriate shapes may be employed to exert the desired tensions thereon.

The various structural units of this invention may be utilized in the manufacture of buildings, bridges, furniture, roadways, heat transfer apparatuses and a wide variety of other constructions and articles by making various combinations of the elements previously described. While it is desirable to use special high strength thin wires, such as those like piano wires or special alloy wires, ordinary steel wires can be employed (they are of greater tensile strengths per unit weight than ordinary tension beams and other members, due to their thinness) and ordinary steel compression members may also be employed. Normally, the compression members will have a length:width ratio greater than the usual limiting slenderness ratio of steel of about 33:1 (such ratio is usually in the 10:1–50:1 range) and generally such ratio will be in the range of about 15:1 to 200:1 preferably 40:1 to 100:1 (the width is considered to be the diameter of a circle of area equal to that of the cross-section of the compression member). The various rods or tubes which may function as compression members will usually have cross-sectional areas in the range of 10 square millimeters to 500 square centimeters, preferably 1 to 200 sq. cm. and more preferably about 1 to 100 sq. cm. but this will depend on the particular application for the structural unit produced. The tension members, which may be wires, tubes or other suitable force-transmitting elements, will normally have cross-sectional areas in the range of 0.2 square millimeter to 10 square centimeters, preferably 1 sq. mm. to 5 sq. cm. and more preferably 2 sq. mm. to 2 sq. cm. Although various shapes of the tension and compression members may be used it will usually be preferred to have the tension members circular in cross-section and the compression members either circular or rectangular. The ratio of tension member cross-sectional area to compression member cross-sectional area will normally be in the range of 0.001 to 0.3, preferably 0.01 to 0.2 and more preferably 0.02 to 0.2.

By use of the tension-compression members of this invention the weight of supporting structures may be significantly reduced, in some cases reductions over 70% being obtainable, by deliberately exceeding the limiting slenderness ratio of the materials used for the compression members and keeping the slim columns employed from buckling by stabilizing and supporting them with light, strong wires, cables or rods which exert balanced tensions on the compression members at points located at distances apart which are small fractions, usually 1/10 to ½ and preferably 1/5 to 2/5 of the limiting slenderness ratio of the compression unit used. Such distances can be from 0.5 to 50 cm., for example, preferably 1 to 30 cm. and more preferably 2 to 10 cm. Normally, the forces on the compression members in use will be from 100 to 100,000 lbs./sq. in., preferably, for most structures, from 2,000 to 20,000 lbs./sq. in. and the tension exerted by the tension wires will be from 10 to 1,000 lbs., preferably, about 20 to 100 lbs. The applicable forces may depend on compression member cross-section, to an extent. Thus the breadth:width ratio of flat members will usually be no greater than 50:1 and preferably is 1:1 to 10:1. However, such are considered to be average figures and may be changed for particular applications.

The structure made will not distort, twist, bend, buckle or break when moved and will resist stresses that normally occur when building, tower or bridge foundations settle. The structure is of improved earthquake-resistant characteristics, too. Such properties are obtained because the present structures are of improved rigidity (the ability of all elements therein to remain immobile with respect to each other), not just of good stability (immobility under vertical compression loads). Prior art structures would normally be designed to be of excessive stability due to the use of heavy compression members but even so they would be of limited rigidity and therefore could be subject to earthquake damage.

In the present invention perimeter compression members have been eliminated, including the normal horizontal and vertical compression members of the conventional rectangular structures and, by use of tension wires or cables, slim compression members, such as spokes or cross-diagonals, have been strengthened so that various tension forces compress or concentrate toward a common center of a plurality of compression members and so that the distances between points at which tension is applied to each compression member are less than the limiting slenderness ratio of that compression member and usually less than half of that ratio.

Various applications of the invention have been referred to but some of these will now be discussed in more detail. In the description a most preferred form of improved wall or panel member is that of FIGS. 1 and 3 while a preferred three-dimensional structural unit is that of FIG. 11, which may be modified so as to replace the internal compression members thereof, which are joined to the crossings of the diagonals of the sides of the parallelepided, with units like those shown in FIG. 4. Such units should normally be employed because if they were not needed it would appear that the compression member diagonals of the structures were too strong. Also, when a three-dimensional tension brace like that of FIG. 4 is employed it will divide the strengthened cube into eight compartments which, in a building, could serve as rooms therein. When employing the present structures for making buildings, towers, dams, bridges, etc., the tension wires thereof may also serve as reinforcements for pretensioned or post-tensioned concrete, plastic or similar surfaces, poured about it, making strengthened walls, ceilings and/or floors. By placing large twin tetrahedron tension cubes one atop the other, towers may be made for use as buildings or as bridge supports and because of the tensioning and strengthening of the compression members such units are stable in all planes and are more shock-resistant than conventional structures, while at the same time being of lighter weight and less expensive. Furthermore, the present structures, especially the elemental structures, lend themselves to mass production by factory techniques.

When pipes or tubes are used as compression members instead of solid bars or strips, they result in lighter weight structural units and the pipe passageways may be used for conveying fluids through them, as in heat transfer or air conditioning applications, wherein a wall panel of one of the structures of this invention, such as that of FIG. 1, modified to have the flat strip compression members replaced by hollow tubes, can have water, air, gas or utility lines pass through. For such applications additional connections will normally be made to such pipes, which are not illustrated in the present drawings. Such connections may be made by threading appropriate portions of the pipes or fittings thereon so that they are readily connectable to other such units when the structure is assembled. When the structural units are on the exterior of a wall or roof, they may be employed as heat absorbing elements to heat water by solar radiation and in such cases a heat transfer fluid may be passed through the hollow pipe compression members. In such instances transparent pipe walls may be employed too and the heat transfer fluid may be colored with a dark dye to make it more heat absorptive.

The structures of the present invention are considered to be unique, although the problem facing the inventor, that of making a better, stronger, lighter weight structural unit, has confronted many ingenious inventors in the past. Among the closer of the references found in a preliminary search are some patents of R. Buckminster Fuller, especially, U.S. Pat. Nos. 2,682,235 and 3,063,521. Also of interest is U.S. Pat. No. 1,009,274 relating to kite structures. The kite patent eliminates perimeter compression units but provides supporting tensions in only two dimensions and does not show compression members of lengths in excess of their limiting slenderness ratio, with tension members so located as to be no farther apart than a length at which the compression member can resist compressive forces. The Fuller patents also do not show multiple wires supporting the compression members along the lengths thereof. The present invention, compared to Fuller's, also provides the advantage of ready standardization, rather than the necessity for utilization of different sizes of the structural units to be employed.

In addition to the structural advantages over the prior art, due to the variety of applications of the principles of the invention and the many combinations of the structures thereof possible, the products of the invention are versatile and lend themselves to many and diverse applications. Thus, in addition to triangular and rectangular panels, panels of other shapes, such as pentagons, hexagons and even irregular shapes may be produced, together with the corresponding three-dimensional objects made from these or from the frameworks thereof. Strengthening may be selective, depending on the number of tension members employed and the distances by which they are set apart and therefore, basic structures can be modified for particular uses on site. Thus, the number of tension wires to a length of compression wire may be as great as one per centimeter or as small as 1 per 50 centimeters or 1 per meter. If desired, the cross-sectional shapes of the compression members may be varied along the lengths thereof, the distances apart of the tension members may be changed and the tension member thickness or the material of the tension member (to alter its strength) may be modified. Such changes, variations from a consistent structure, will normally not be effected unless they give advantages with respect to useful increased strength of the structural unit, increased resistance to shock, lesser weight and/or lower construction costs.

The materials of construction employed, while they may include exotic alloys, especially for the very thin tension wires, may be ordinary such materials, such as steel, stainless steel, aluminum, wood, synthetic organic polymeric material, e.g., fiberglass reinforced polyester resins, etc. Generally, the use of metals will be favored because of their resistance to deterioration on long use and because they have a lesser tendency to creep or expand under tension over a period of time than do organic materials.

The invention has been described with respect to various illustrations and embodiments thereof but is not to be limited to these because it is evident that one of skill in the art with the present specification before him would be able to utilize substitutes and equivalents for elements thereof without departing from the spirit and scope of the invention.

What is claimed is:

1. A light weight essentially planar structural unit which comprises at least three compression members in contact with each other in an interior portion of the unit and a plurality of tension members in contact with such compression members and exerting balanced forces on the compression members in the plane of the structural unit to hold the compression members in position with respect to each other and to strengthen them, said tension members producing compression forces in the compression members which are directed in the plane of the structural unit toward the point of contact of the compression members in the interior portion of the plane of the structural unit, said forces plus compressive forces applied to the compression members exceeding the amount of force normally required to buckle said compression members and said tension members being distributed along the lengths of the compression members so that the distances between the tension members along the compression members are less than the lengths at which the compression members alone would buckle under the total compressive forces thereon.

2. A structural unit according to claim 1 wherein the compression members are interior compression members which are rods or tubes of individual cross-sectional area in the range of ten square millimeters to 500 square centimeters, the tension members are wires or tubes of individual cross-sectional area in the range of 0.2 sq. mm. to 10 sq. cm., the ratio of tension member cross-sectional area to compression member cross-sectional area is in the range of 0.02 to 0.2, and a plurality of tension members is in the unit which are parallel to each other and from one cm. to 30 cm. apart and which connect the compression members.

3. A planar structural unit according to claim 2 wherein the compression members are diagonals of a rectangle joined together at a crossing point thereof and the tension members are parallel to the sides of the rectangle.

4. A light weight essentially planar structural unit adapted for mounting together with other such units which comprises at least three compression members in contact with each other in an interior portion of the unit, a plurality of tension members in contact with such compression members and exerting balanced forces on the compression members in the plane of the structural unit to hold the compression members in position with respect to each other and to strengthen them, said tension members producing compression forces in the compression members which are directed in the plane of the structural unit toward the locus of contact of the compression members in the interior portion of the plane of the structural unit, said forces plus compressive forces applied to the compression members exceeding the amount of force normally required to buckle said compression members and said tension members being distributed along the lengths of the compression members so that the distance between the tension members along the compression members is less than the length at which the compression members alone would buckle under the total compressive forces thereon, and means for mounting the unit onto other such units.

5. A light weight planar structural unit according to claim 4 wherein the compression members are diagonals of a rectangle joined together at a crossing point thereof, the tension members are parallel to corresponding sides of the rectangle and the means for mounting the unit onto other such units is at an end of at least one of the diagonals.

6. A light weight structural unit according to claim 5 which is of rectangular cross-section and wherein the diagonal compression members are flat and have mounting means which are bent portions at the ends thereof so that such ends are parallel to a side of the rectangle, a plurality of sets of tension wires is joined to the flat compression members, with the wires of such sets being positioned apart a distance extending transversely across the widths of the flat compression members and the ratio of tension member individual cross-sectional areas to compression member individual cross-sectional areas is in the range of 0.02 to 0.2.

7. A light weight essentially planar structural unit which comprises at least three flat compression members in contact with each other in an interior portion of the unit and a plurality of tension members in contact with such compression members and exerting balanced forces on the compression members only in the plane of the structural unit to hold the compression members in position with respect to each other and to strengthen them, said tension members producing compression forces in the compression members which are directed only in the plane of the structural unit toward the locus of contact of the compression members in the interior portion of the plane of the structural unit, said forces plus compressive forces applied to the compression members exceeding the amount of force normally required to buckle said compression members and said tension members being distributed along the lengths of the compression members so that the distances between the tension members in directions along the lengths of the compression members are less than the lengths at which the compression members alone would buckle under the total compressive forces thereon in the absence of the tension members.

8. A light weight planar structural unit according to claim 7 wherein a plurality of sets of tension wires, parallel to each other, is joined to the flat compression members, with the wires of such sets being positioned apart a distance extending transversely across the compression members.

9. A light weight essentially planar structural unit which comprises at least three compression members in contact with each other in an interior portion of the unit, which are rods or tubes having individual cross-sectional areas in the ranges of 10 square millimeters to 500 square centimeters and which are flat diagonals of a rectangle joined together at a crossing point thereof with ends thereof bent so that they are parallel to a side of the rectangle, and a plurality of sets of tension wires in contact with such compression members having individual wire cross-sectional areas in the range of 0.2 sq. mm. to 10 sq. cm., parallel to the corresponding sides of the rectangle and to each other and from 1 to 30 cm. apart along the compression members and joined to the flat compression members, with such sets being positioned apart a distance extending transversely across the compression members and exerting balanced forces on the compression members in the plane of the structural unit to hold the compression members in position with respect to each other and to strengthen them, said tension members producing compression forces in the compression members which are directed in the plane of the structural unit toward the point of contact of the compression members in the interior portion of the plane of the structural unit at the crossing point of the diagonals thereof, said forces plus compressive forces applied to the compression members exceeding the amount of force normally required to buckle said compression members and said tension members being distributed along the lengths of the compression members so that the distance between the tension members along the compression members is less than the length at which the compression members alone would buckle under the total compressive forces thereon, with the ratio of tension member cross-sectional area to compression member cross-sectional area being in the range of 0.02 to 0.2.

* * * * *